US012806651B2

(12) United States Patent
Bolyard, Jr. et al.

(10) Patent No.: US 12,806,651 B2
(45) Date of Patent: Nov. 24, 2026

(54) FIELD-CONFIGURABLE, EXCHANGEABLE, AND REVERSIBLE EXTRUDER ASSEMBLY FOR A FLUID APPLICATION SYSTEM

(71) Applicant: Illinois Tool Works Inc., Glenview, IL (US)

(72) Inventors: Edward Wayne Bolyard, Jr., Old Hickory, TN (US); Mel Steven Lessley, Villa Hills, KY (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 570 days.

(21) Appl. No.: 18/066,227

(22) Filed: Dec. 14, 2022

(65) Prior Publication Data

US 2023/0191442 A1 Jun. 22, 2023

Related U.S. Application Data

(60) Provisional application No. 63/291,554, filed on Dec. 20, 2021.

(51) Int. Cl.

*B05C 11/10* (2006.01)
*B05C 5/02* (2006.01)
*B05D 1/26* (2006.01)

(52) U.S. Cl.

CPC ........ *B05C 11/1002* (2013.01); *B05C 5/0225* (2013.01); *B05C 5/0241* (2013.01); *B05C 5/027* (2013.01); *B05C 11/1005* (2013.01); *B05D 1/265* (2013.01)

(58) Field of Classification Search

USPC ............... 118/410–412, 419, 420; 427/430.1
See application file for complete search history.

(56) References Cited

U.S. PATENT DOCUMENTS 9,718,083 B2 8/2017 Lessley et al.
10,081,022 B2 * 9/2018 Ayers ...................... B05B 1/044
10,421,095 B2 9/2019 Bolyard et al.
10,744,524 B2 8/2020 Lessley et al.

(Continued)

FOREIGN PATENT DOCUMENTS

EP 3643411 A1 * 4/2020 ............. B05C 5/025
JP 2004148184 A 5/2004
WO 2018013684 A1 1/2018

OTHER PUBLICATIONS

International Preliminary Report on Patentability mailed Jul. 4, 2023 for corresponding International Application No. PCT/US2022/081668 (10 pages).

(Continued)

*Primary Examiner* — Yewebdar T Tadesse
(74) *Attorney, Agent, or Firm* — Carroll, Hoette & Butscher, LLC; Josef L. Hoffmann

(57) ABSTRACT

An extruder assembly may include an entry die, an exit die, and one or more shims. The exit die can be coupled with a fluid applicator system with the entry die facing away from a body of the system to direct adhesive flowing into the exit die, through the shims, and out of the exit die, the entry die, and the shims onto a web or strand moving in a first direction. The entry die may be coupled with the body of the system with the exit die facing away from the body to direct the adhesive onto a web or strand moving in a second, opposite direction.

20 Claims, 17 Drawing Sheets

(56) References Cited

U.S. PATENT DOCUMENTS

| | | | | |
|---|---|---|---|---|
| 2005/0155549 | A1* | 7/2005 | Pekurovsky | B05C 5/0254 118/410 |
| 2014/0050883 | A1 | 2/2014 | Hanschen et al. | |
| 2017/0065987 | A1 | 3/2017 | Pahl et al. | |
| 2017/0266687 | A1* | 9/2017 | Lessley | B29C 48/2566 |
| 2019/0299240 | A1* | 10/2019 | Ayers | B29C 48/08 |

OTHER PUBLICATIONS

Nordson, "Harmony Modules Continuous and Intermittent", Issued May 2021, 2 pages.

International Search Report and Written Opinion mailed May 9, 2023 for corresponding International Application No. PCT/US2022/081668 (12 pages).

* cited by examiner

FIELD-CONFIGURABLE, EXCHANGEABLE, AND REVERSIBLE EXTRUDER ASSEMBLY FOR A FLUID APPLICATION SYSTEM

CROSS-REFERENCE TO RELATED APPLICATIONS

This application claims priority to U.S. Provisional Application No. 63/291,554 (filed 20-Dec.-2021), the entire contents of which are incorporated herein by reference.

BACKGROUND

Technical Field

The subject matter described herein relates to extruders, such as extruders that dispense hot melt adhesives.

Discussion of Art

Fluid application systems can include modular nozzles for applying a fluid to an article, such as applying a hot melt adhesive to a web or strand of material. The web or strands may be bonded to the nonwoven fabric with the adhesive, such as glue or glue fiber. The webs or strands can be fed past a nozzle on an adhesive application device. The nozzle may include a plurality of openings through which the glue or glue fiber may be discharged. In some nozzles, a second fluid, such as air, may be discharged through separate outlets to control the application of the glue fiber such that the glue fiber is vacillated across the respective webs or strands as the webs or strands pass by the nozzle.

The adhesive application system may apply adhesive to the webs or strands with either a contact nozzle or a non-contact nozzle. A contact nozzle discharges a volume of glue onto a substrate, such as a web of material, as the web of material is fed by the glue. The web is in contact with the glue as the web is fed by, and the glue adheres to the web as a result of the contact. In a non-contact nozzle, the glue may be discharged from an outlet, for example, as a fiber. The glue is discharged over a gap between the outlet and the web, and is ultimately received on the web. Discharging the glue fiber may be controlled by a second fluid, such as air, discharged from adjacent outlets, to vacillate the glue fiber during application on the web.

The fluid application systems can include extruders that contact or are close to the webs as the adhesive is applied to the webs. The webs may move beneath the extruders in one direction so that excess adhesive does not build up on the fluid application systems or the webs. For example, the extruders can include surfaces that wipe or otherwise clear the excess adhesive off the webs without building up the adhesive on the extruders. But the extruders may be configured so that the webs can move beneath the fluid application systems in only a single direction. This can significantly restrict where the fluid application systems can be positioned within a manufacturing machine. For example, some extruders are configured for the web to flow in a single direction only. The extruders must be mounted in the fluid application systems so that the path of the web or strand is in the only direction allowed by the fluid application system. Sometimes the constraints of the fluid application systems are such that the fluid application systems may not fit without reversing the direction in which the webs or strands move. Currently, this requires a special, customized extruder design with new die plates and shims. This can significantly add to the time and cost in providing the fluid application systems.

BRIEF DESCRIPTION

An extruder assembly may include an entry die including one or more first openings, an exit die including one or more second openings, and one or more shims disposed between the entry die and the exit die. The one or more shims may include one or more channels and the exit die may be coupled with a body of a fluid applicator system with the entry die facing away from the body of the fluid applicator system to direct a fluid adhesive flowing into the exit die, through the one or more channels in the one or more shims, and out of the exit die, the entry die, and the one or more shims onto a first web or strand of material moving in a first direction relative to the entry die and the exit die. The entry die may be coupled with the body of the fluid applicator system with the exit die facing away from the body of the fluid applicator system to direct the fluid adhesive flowing into the entry die, through the one or more channels in the one or more shims, and out of the entry die, the exit die, and the one or more shims onto a second web or strand of material moving in a second direction relative to the entry die and the exit die.

A method is provided that may include attaching an extruder assembly with an applicator head of an adhesive applicator system. The extruder assembly may have one or more shims with one or more channels between an entry die having one or more first openings and an exit die having one or more second openings. The one or more shims may be positioned between the entry die and the exit die with the one or more channels of the one or more shims fluidly coupled with the one or more first openings of the entry die or the one or more second openings of the exit die. The one or more shims may be oriented to direct a fluid adhesive from the applicator head via the one or more first openings in the entry die or the one or more second openings in the exit die onto a first web or strand of material moving in a first direction beneath the entry die and the exit die. The method also may include removing the one or more shims from between the entry die and the exit die, and switching positions of the entry die and the exit die relative to the applicator head. The method can include coupling the entry die, the one or more shims, and the exit die with the applicator head after switching positions of the entry die and the exit die. The entry die, the one or more shims, and the exit die may be coupled with the applicator head to direct the fluid adhesive onto a second web or strand of material moving in a second direction beneath the entry die and the exit die.

A reversible extruder assembly for a hot melt adhesive fluid applicator system also is provided. The extruder assembly may include an entry die including one or more first openings and one or more first internal channels, an exit die including one or more second openings and one or more second internal channels, and one or more shims having one or more third internal channels. The one or more shims may be positioned between the entry die and the exit die with the one or more third internal channels of the one or more shims fluidly coupled with the one or more first internal channels of the entry die and the one or more second internal channels of the exit die.

BRIEF DESCRIPTION OF THE DRAWINGS

The inventive subject matter may be understood from reading the following description of non-limiting embodiments, with reference to the attached drawings, wherein below.

DETAILED DESCRIPTION

One or more embodiments of the inventive subject matter described herein provide fluid applicator systems having reversible extruder assemblies that allow for the fluid applicator systems to quickly and easily be converted between states where the webs or strands move in different directions. For example, in an outbound state, the extruder assemblies are configured to apply adhesive to the webs or strands moving in an outbound direction (e.g., a first direction in which the webs or strands move underneath the body of the applicator system before moving beneath the extruder assembly). In a different, inbound state, the extruder assemblies are configured to apply the adhesive to the webs or strands moving in an opposite, inbound direction (e.g., a second direction in which the webs or strands move underneath the extruder assembly before moving beneath the body of the applicator system), without having to change, re-position, or otherwise re-configure the fluid applicator systems.

One or more examples of the extruder assemblies described herein may be field configurable, rapid change-over (RCO) assemblies in that the extruder assemblies can be quickly disassembled and reassembled in the field. For example, the extruder assemblies may be at least partially formed of several components that are clamped together by one or more threaded fasteners, where the threaded fasteners do not need to be completely removed from the assemblies (only loosened) to change the configuration or state of the assemblies. This is in contrast to a non-RCO extruder assembly that may include components held or clamped together by one or more fasteners (e.g., bolts) that extend through several through holes in the components. These types of fasteners may need to be completely removed from the assembly.

The extruder assemblies described herein may be used for different application types, such as spray applicators, strand applicators, or slot applicators. For example, the reversible extruder assemblies can switch between use as a spray applicator to use as a strand applicator, to use as a slot applicator, and so on, while also being able to change the direction in which the web or strands move relative to the extruder assemblies. This interchangeable aspect allows for the reversible extruder assemblies to not only change the direction in which the webs or strands move beneath the extruder assemblies, but also how the adhesive is dispensed from the extruder assemblies (e.g., strand versus slot versus spray).

Figure 1:
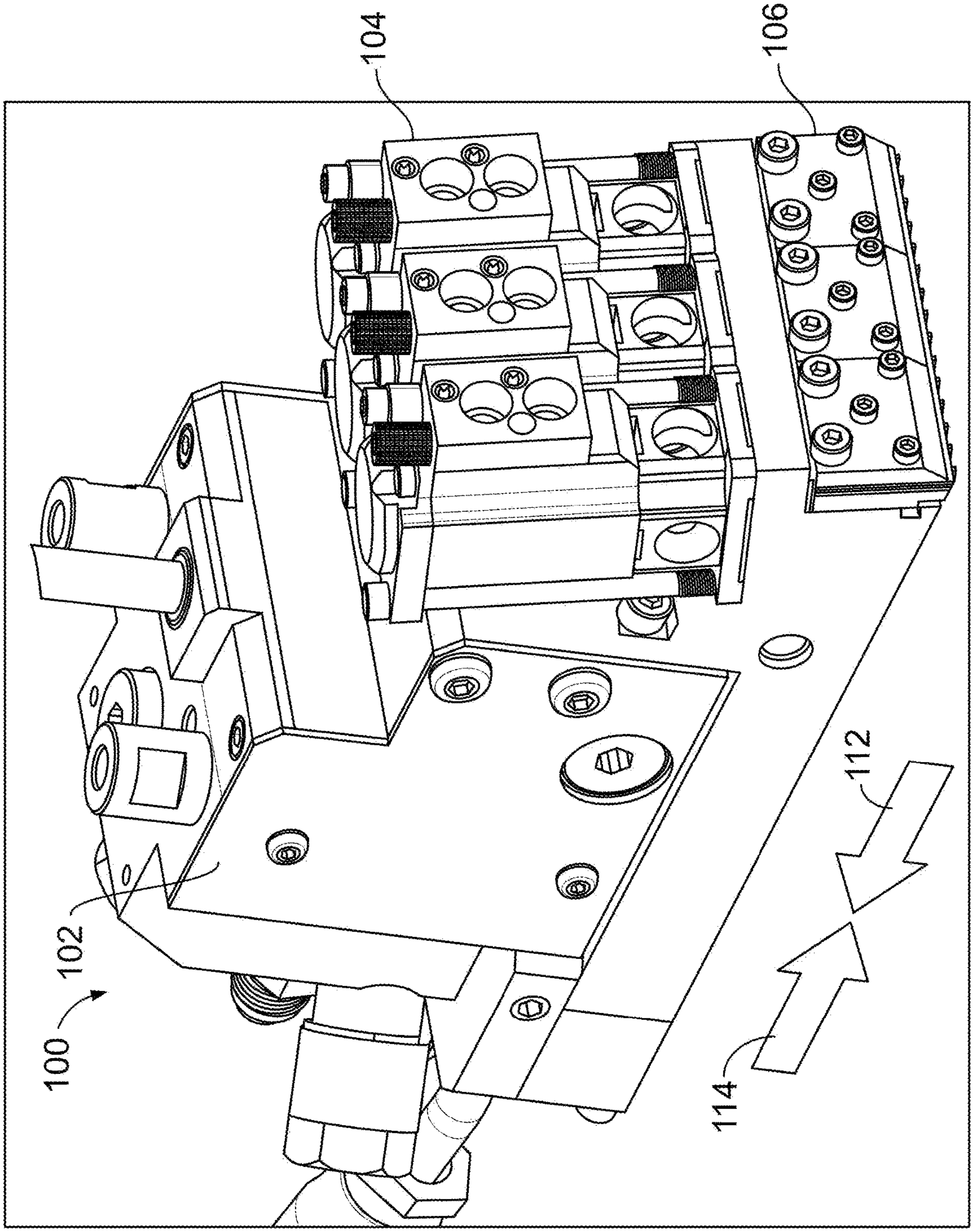
FIG. 1 illustrates an example of a fluid applicator system.
Figure 2:
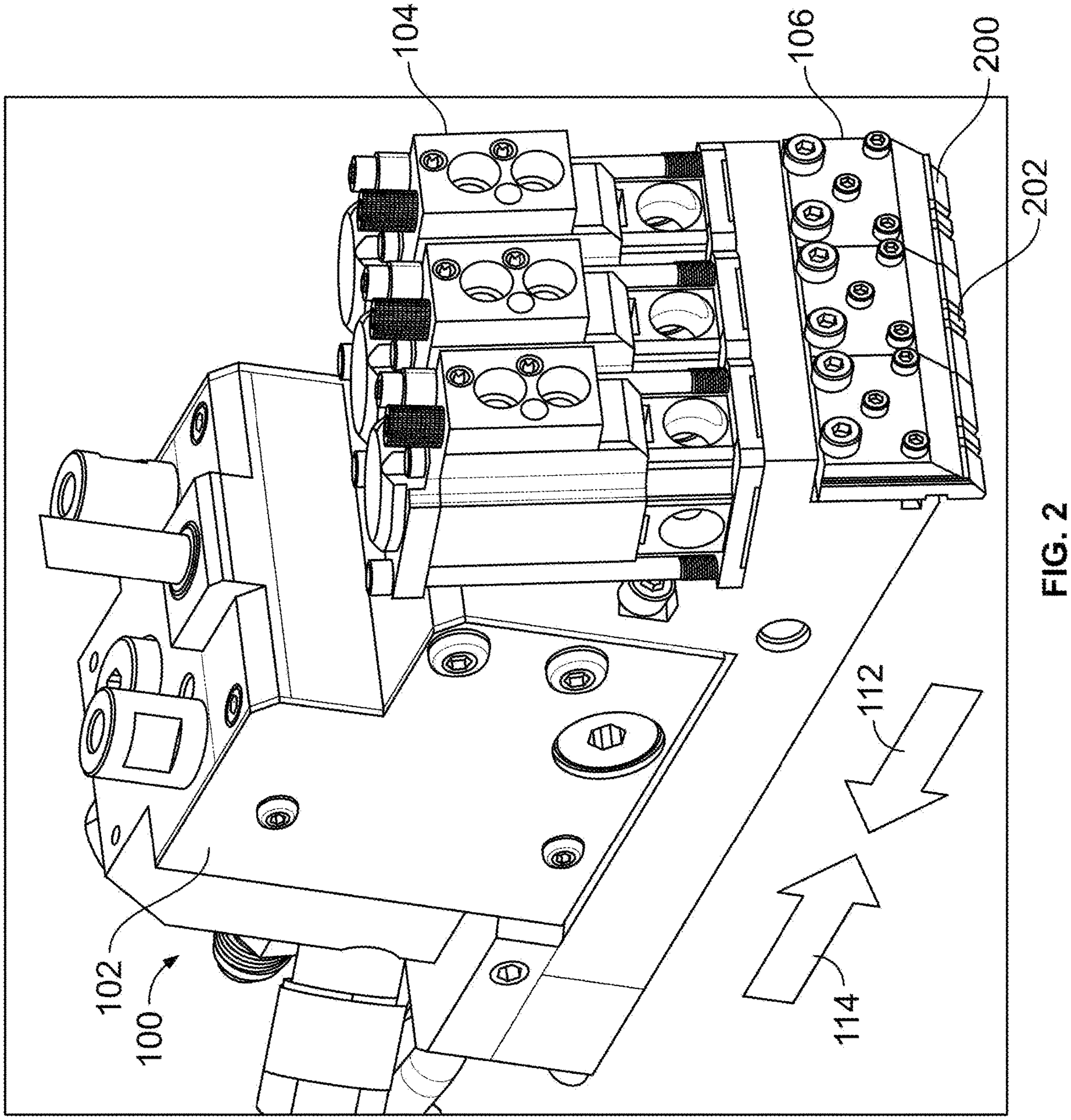
FIG. 2 illustrates another example of a fluid applicator system.

FIGS. 1 and 2 illustrate examples of a fluid applicator system 100. The fluid applicator system includes an applicator head or body 102 coupled with one or more valve modules 104 and an extruder assembly 106. The applicator head receives fluids (e.g., adhesive from one source and air from another source) and directs the fluids into the valve modules. The fluids flow into the valve modules, and the valve modules are controlled (e.g., pneumatically and/or electrically) to meter delivery of the adhesive and air into and through the extruder assembly to the web or strands of material moving below the extruder assembly. These webs can be flat, planar bodies, strands of material, etc. The fluid applicator system shown in FIG. 1 includes the nozzles that direct the adhesive onto webs or strands of material moving below the fluid applicator system. The fluid applicator system shown in FIG. 1 is configured for applying the adhesive onto larger areas of webs of material, while the fluid applicator system shown in FIG. 2 includes a guide bar 200 with slots 202 through which strands of material move during application of adhesive.

With some known fluid applicator systems, the webs or strands of material that receive the adhesive move in only a single outbound direction 114. In one embodiment of the inventive subject matter described herein, the extruder assembly is designed or configured to be easily removed from the fluid applicator system, re-configured, and then attached to the fluid applicator system in the same location to allow for the webs or strands of material to move in an inbound direction 112 that is opposite the outbound direction (or, the extruder assembly can initially be configured for the webs or strands to move in the outbound direction and then re-configured for movement of the webs or strands in the inbound direction). The extruder assembly optionally can later be removed again, re-configured, and re-attached to the fluid applicator systems so the strands or webs can return to moving in the inbound direction during application of the adhesive.

Figure 3:
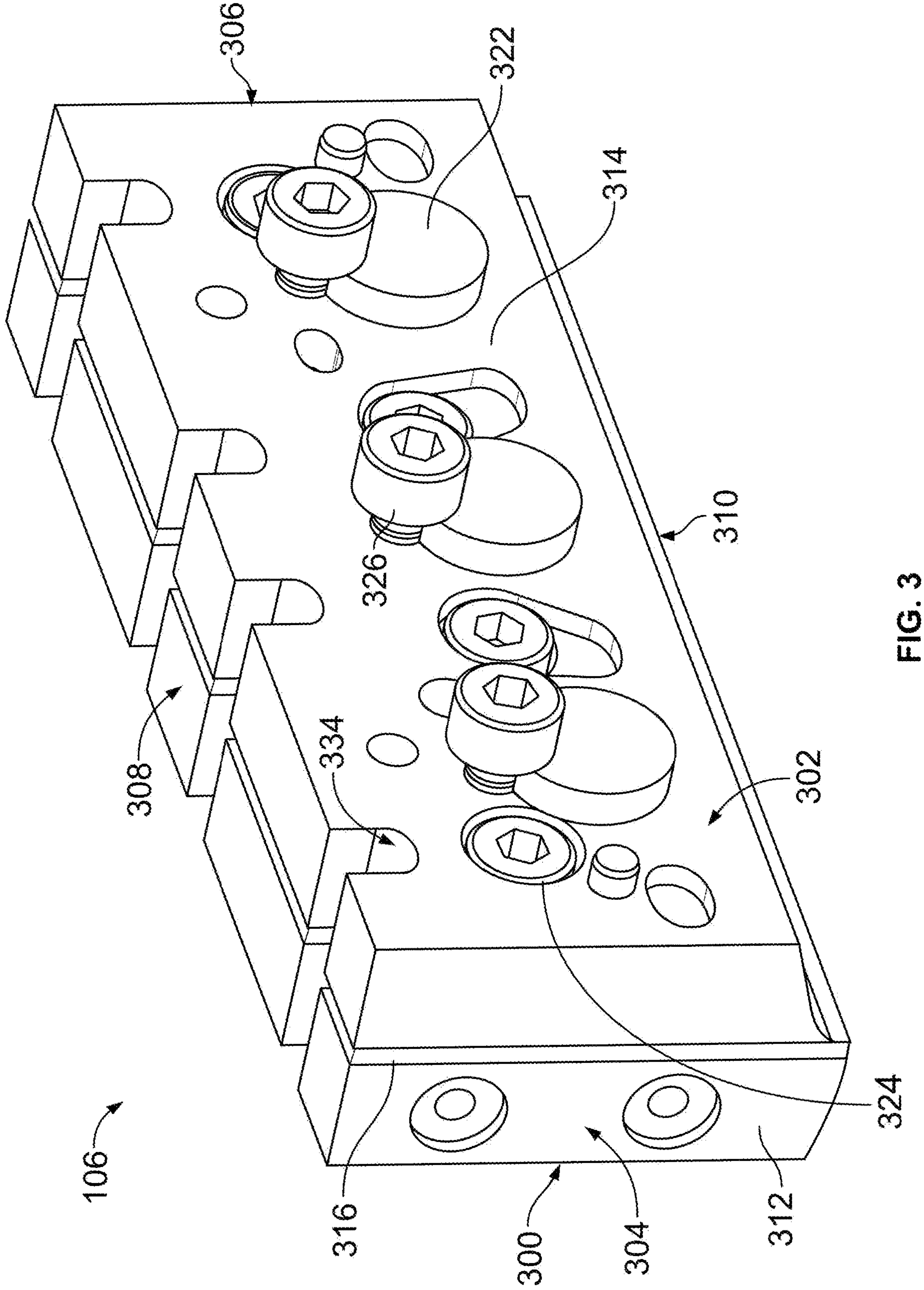
FIG. 3 is a perspective view of one example of an extruder assembly shown in FIGS. 1 and 2.
Figure 4:
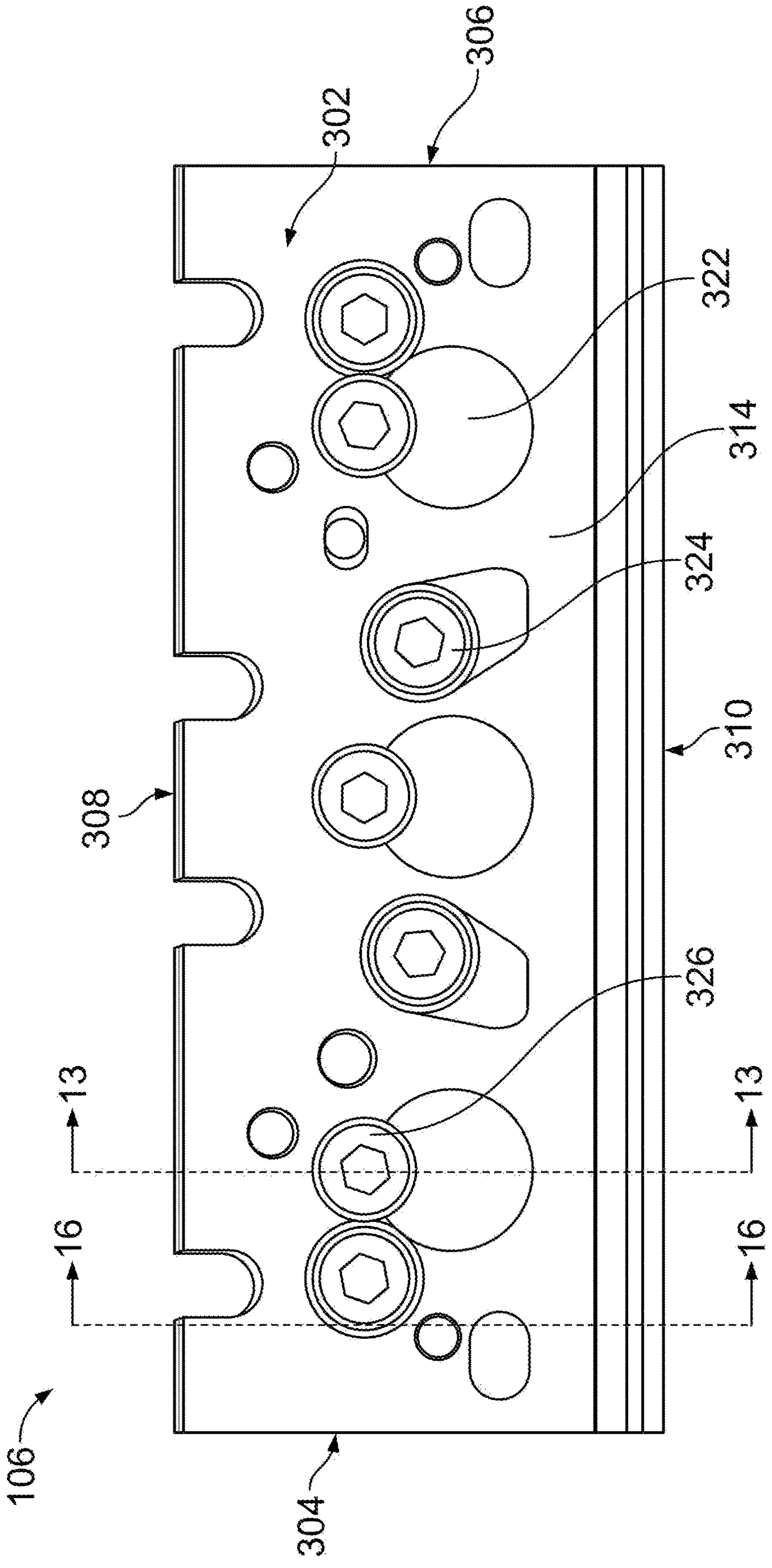
FIG. 4 is an elevational view of an exit side of the extruder assembly shown in FIG. 3.
Figure 5:
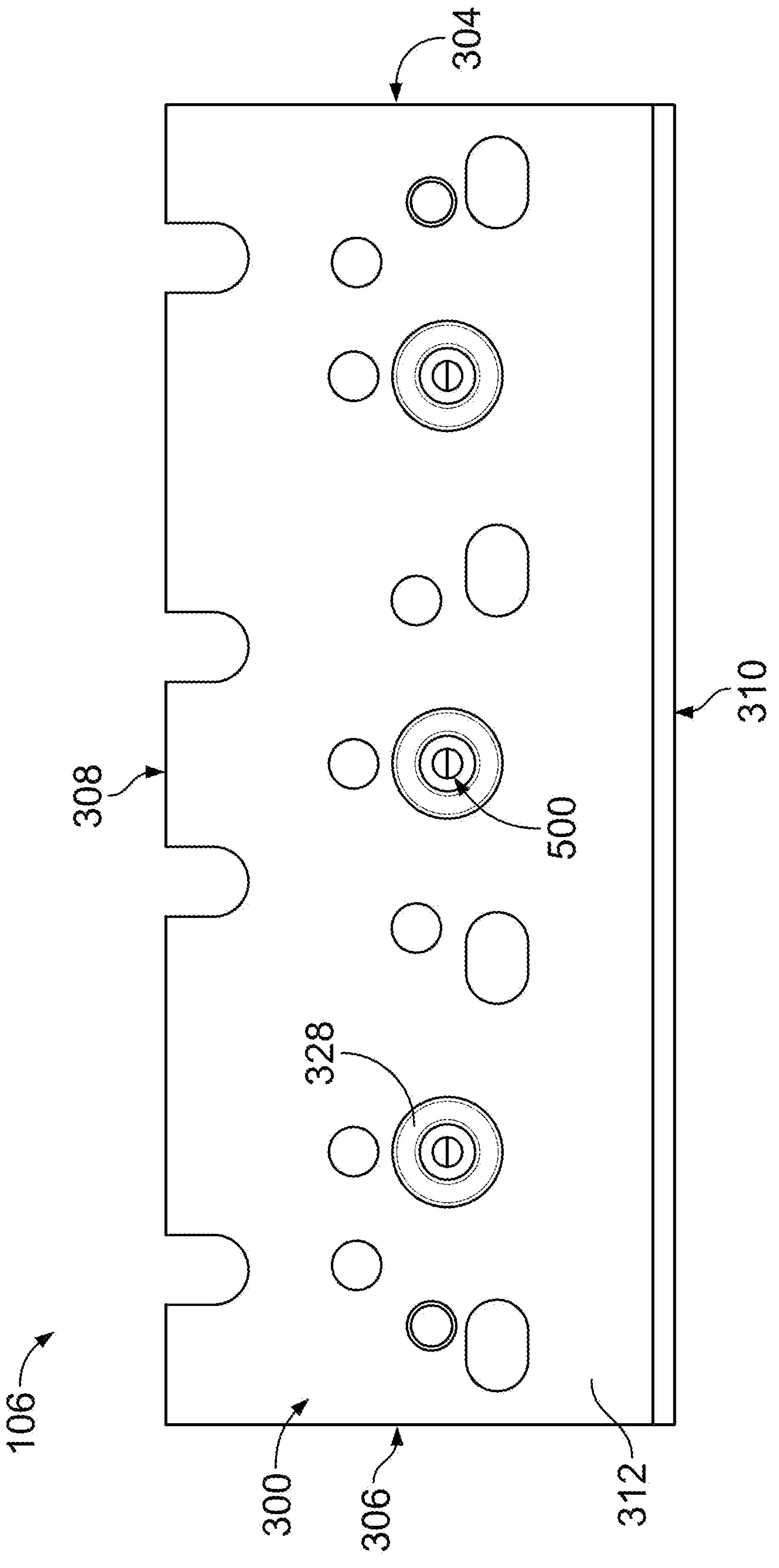
FIG. 5 is an elevational view of an opposite, entry side of the extruder assembly shown in FIG. 3.
Figure 6:
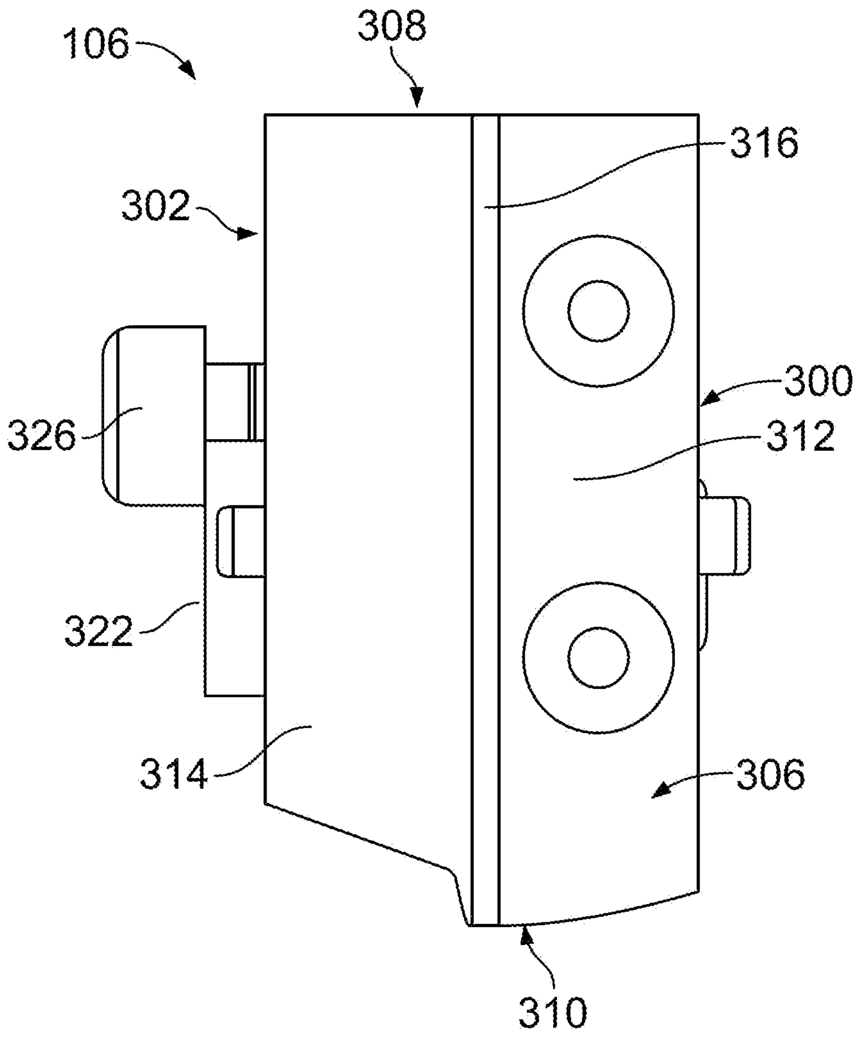
FIG. 6 is a plan view of either end of the extruder assembly shown in FIG. 3.
Figure 7:
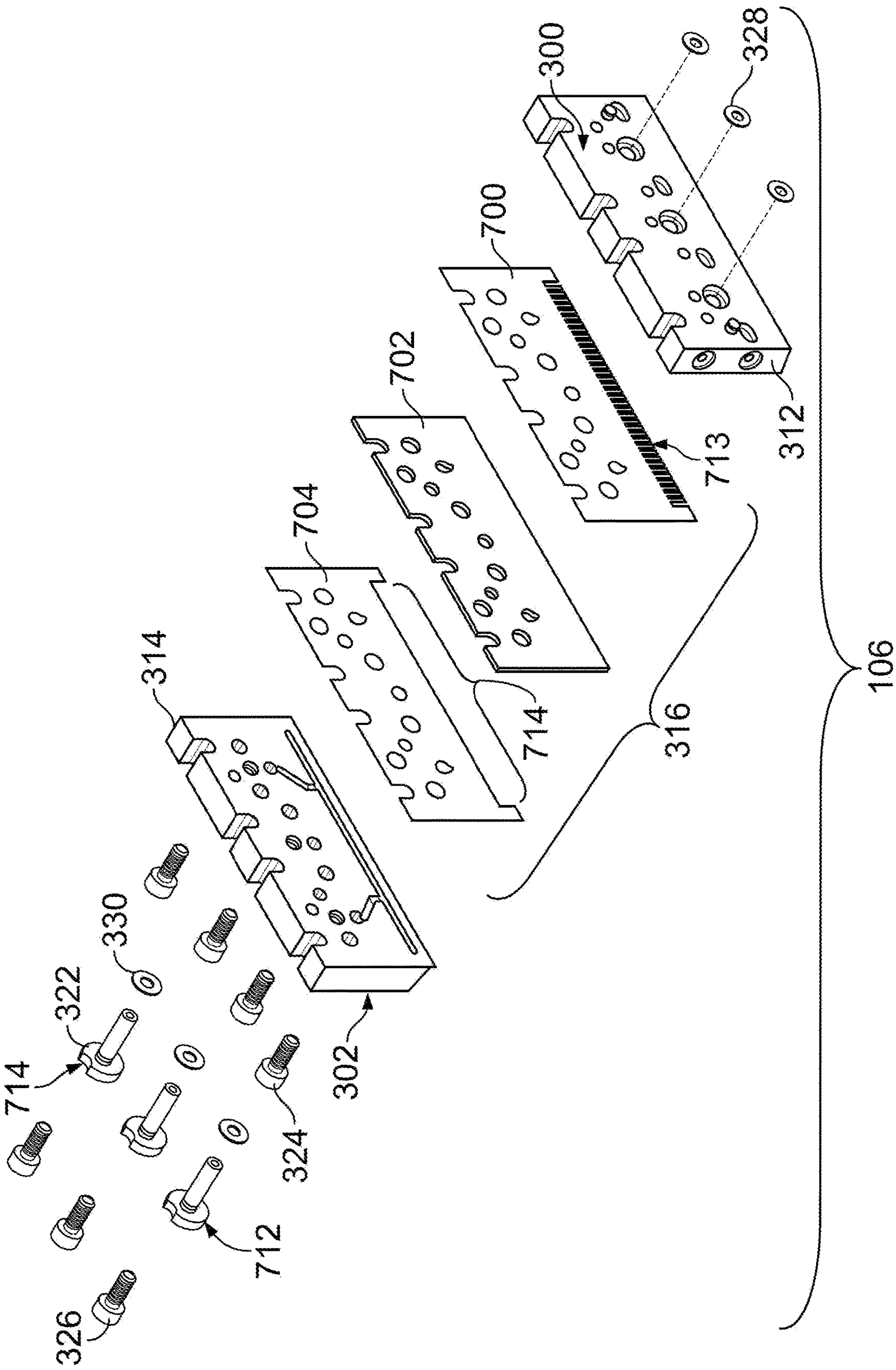
FIG. 7 is an exploded view of the extruder assembly shown in FIG. 3 while the extruder assembly is in an inbound direction configuration.

FIG. 3 is a perspective view of one example of the extruder assembly. FIG. 4 is an elevational view of an exit side of the extruder assembly shown in FIG. 3. FIG. 5 is an elevational view of an opposite, entry side of the extruder assembly shown in FIG. 3. FIG. 6 is a plan view of either end of the extruder assembly shown in FIG. 3. The extruder assembly can be formed from multiple components joined together to form the extruder assembly but that also can be separated from each other and re-assembled in another manner to change the configuration of the extruder assembly to allow for movement in different direction of the webs or strands (relative to the extruder assembly).

The extruder assembly extends from an entry side 300 (also shown in FIG. 5) to an opposite exit side 302 (also shown in FIG. 4) along the inbound direction or the outbound direction (depending on the configuration of the extruder assembly). For example, when the extruder assembly is configured for the webs or strands to move in the inbound direction, then the extruder assembly may extend from the entry side to the exit side along the inbound direction. When the extruder assembly is configured for the webs or strands to move in the outbound direction, then the extruder assembly may extend from the entry side to the exit side along the outbound direction.

The extruder assembly also extends from a first end 304 to an opposite, second end 306 along a first transverse direction that is transverse (e.g., perpendicular) to the inbound direction and the outbound direction. The end of the extruder assembly shown in FIG. 6 can represent the first end and/or the second end of the extruder assembly. The extruder assembly extends from a coupling side 308 to an opposite, applicator side 310 in a second transverse direction that is transverse (e.g., perpendicular) to the inbound direction, the outbound direction, and the transverse direction. The coupling side of the extruder assembly is connected with or otherwise faces the valve modules. The applicator side of the extruder assembly faces the webs or strands of material as the webs or strands move below the fluid applicator system.

Figure 8:
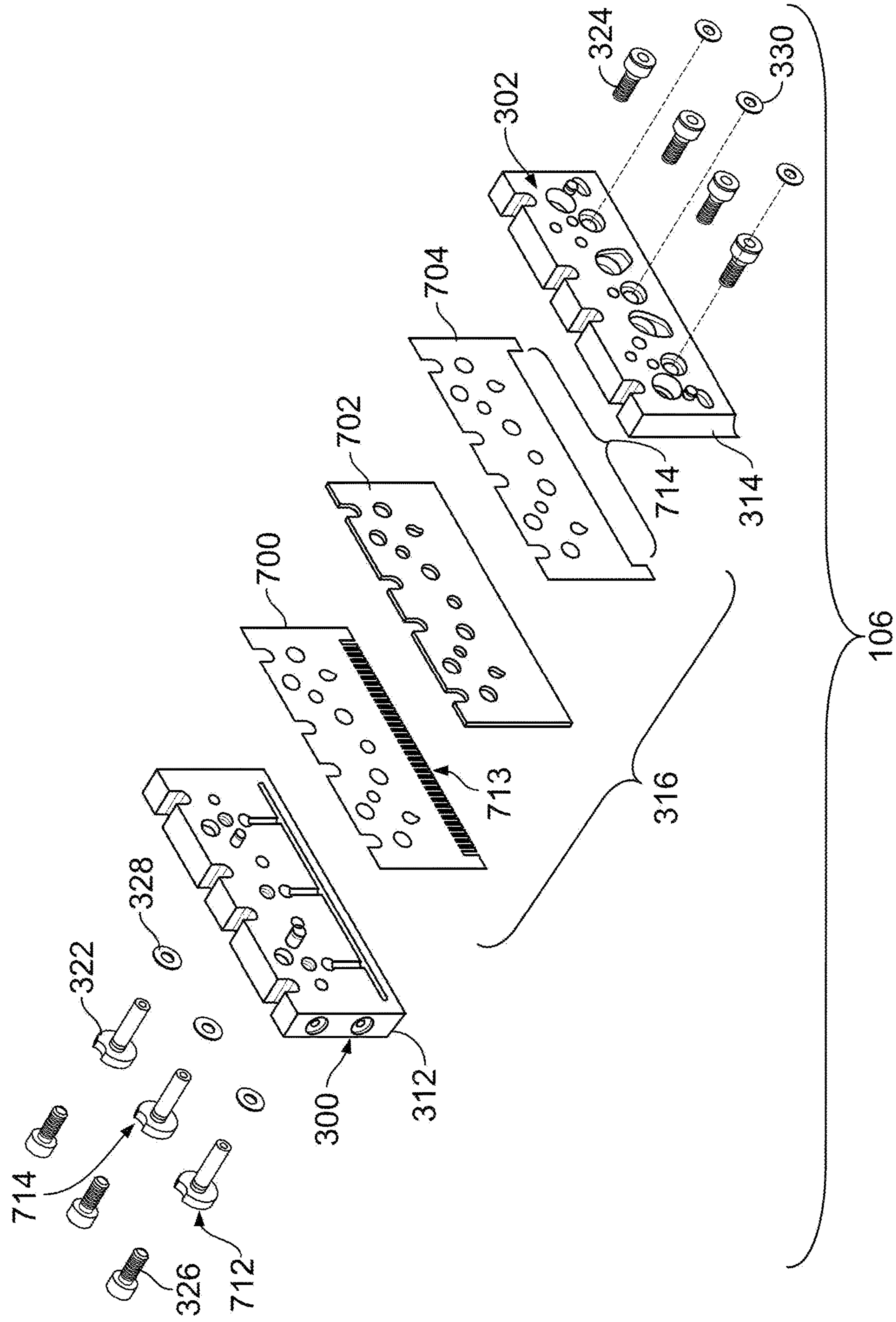
FIG. 8 is an exploded view of the same extruder assembly of FIG. 7 while the extruder assembly is in an outbound direction configuration.

With continued reference to the extruder assembly shown in FIGS. 3 through 6, FIG. 7 is an exploded view of the extruder assembly shown in FIG. 3 while the extruder assembly is in an outbound direction configuration and FIG. 8 is an exploded view of the extruder assembly while the extruder assembly is in an inbound direction configuration. In the inbound direction configuration, the extruder assembly is configured to apply the adhesive onto the webs or strands of material moving in the inbound direction 112. In the outbound direction configuration, the extruder assembly is configured to apply the adhesive onto the webs or strands of material moving in the outbound direction 114.

The extruder assembly includes an entry die 312 that includes the entry side of the extruder assembly. In FIG. 8, the entry side of the entry die faces outward and away from the applicator head of the fluid applicator system during application of the adhesive to the webs or strands of material. The extruder assembly also includes an exit die 314 that includes the exit side of the extruder assembly. The exit side of the entry die faces inward and toward the applicator head of the fluid applicator system during application of the adhesive to the webs or strands of material.

A shim assembly 316 (shown in FIG. 3) includes one or more shims 700, 702, 704 disposed between the entry die and the exit die in one example of the extruder assembly. Alternatively, a single shim, two shims, or more than three shims may be included in the extruder assembly between the entry die and the exit die. The entry die and the exit die can abut the shim(s) such that the entry die, shim(s), and exit die are stacked against each other or sandwiched together. The examples shown in FIGS. 7 and 8 include three shims, while the examples shown in FIGS. 13 and 14 (described below) include only a single shim (e.g., the shim 700). The shims are planar bodies that direct the flow of adhesive between the entry and exit dies, as described herein.

Figure 9:
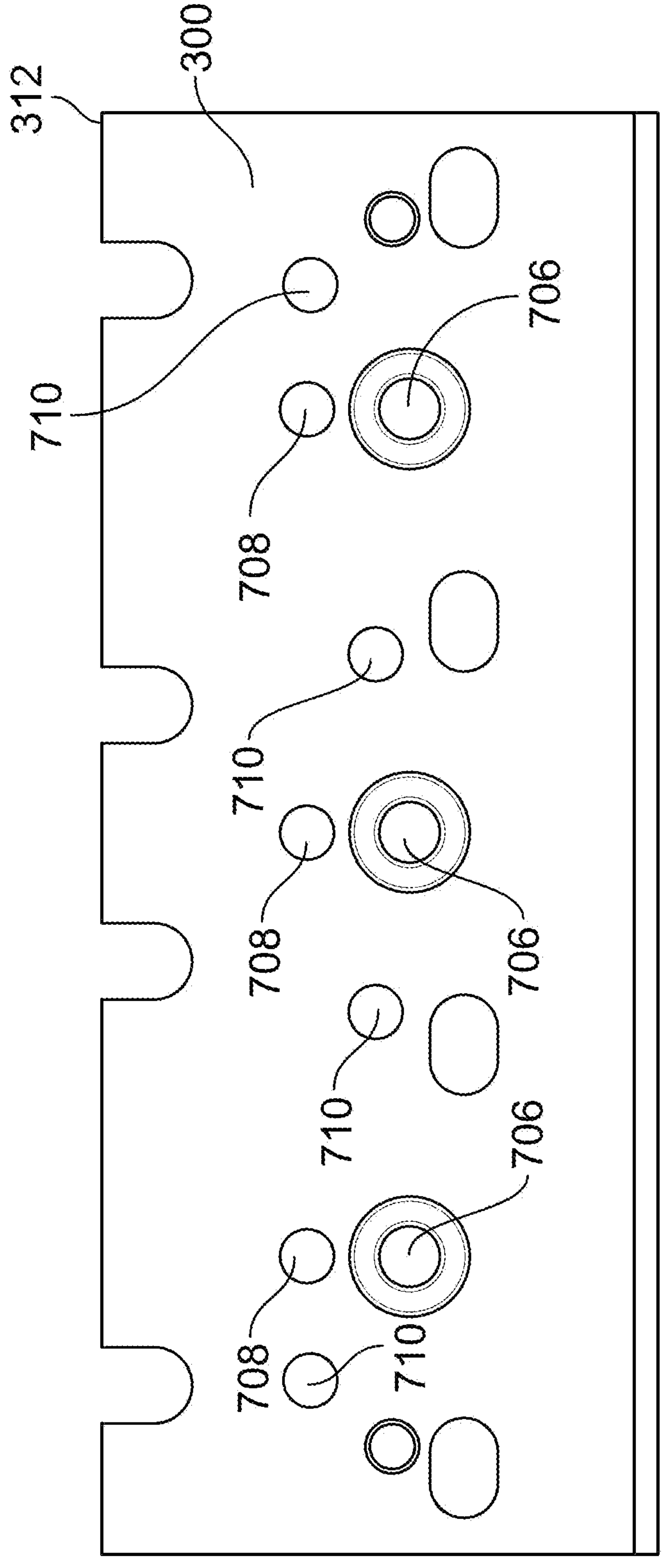
FIG. 9 illustrates an elevational view of the entry side of an entry die of the extruder assembly shown in FIG. 3.
Figure 10:
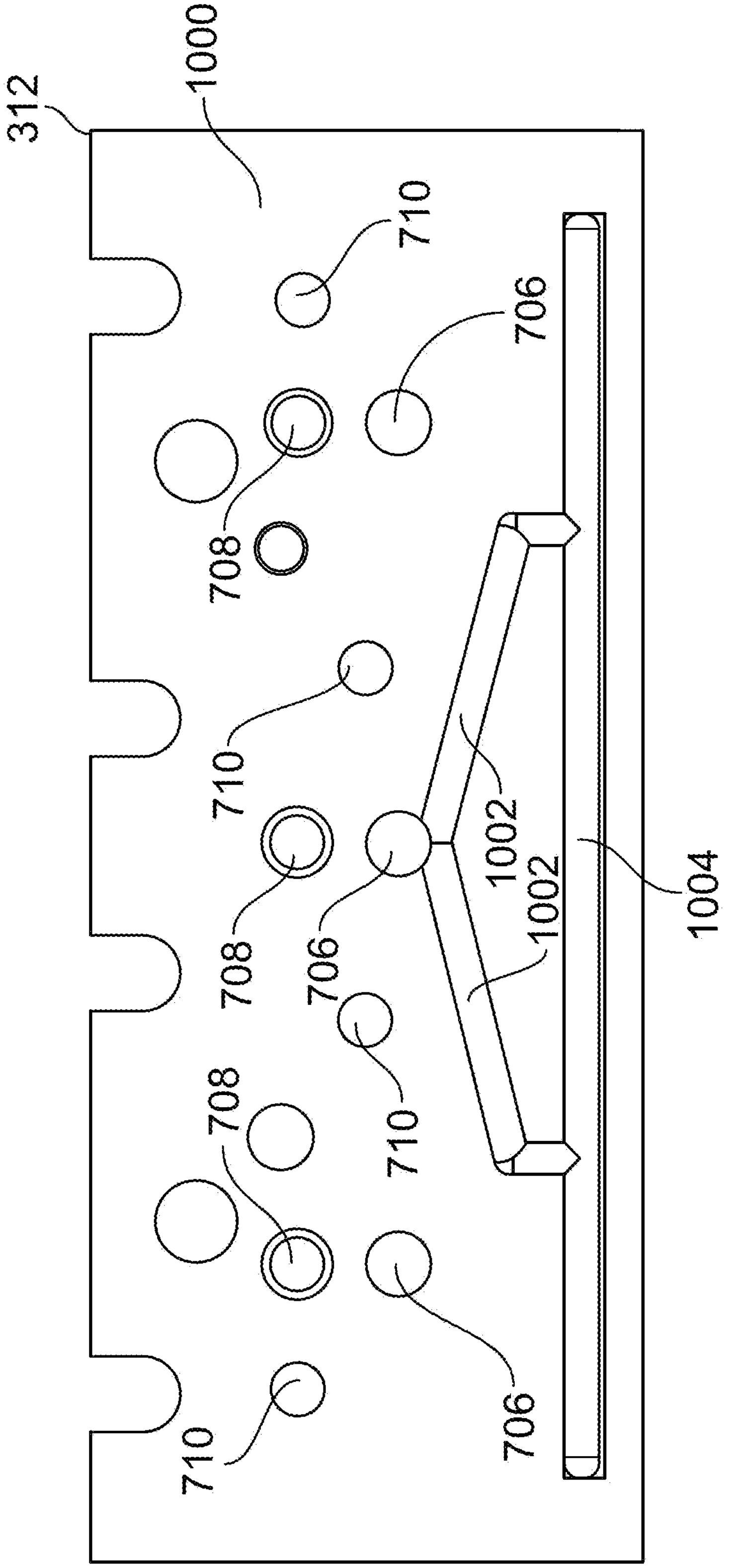
FIG. 10 illustrates an elevational view of an opposite interior side of the entry die shown in FIG. 9.
Figure 11:
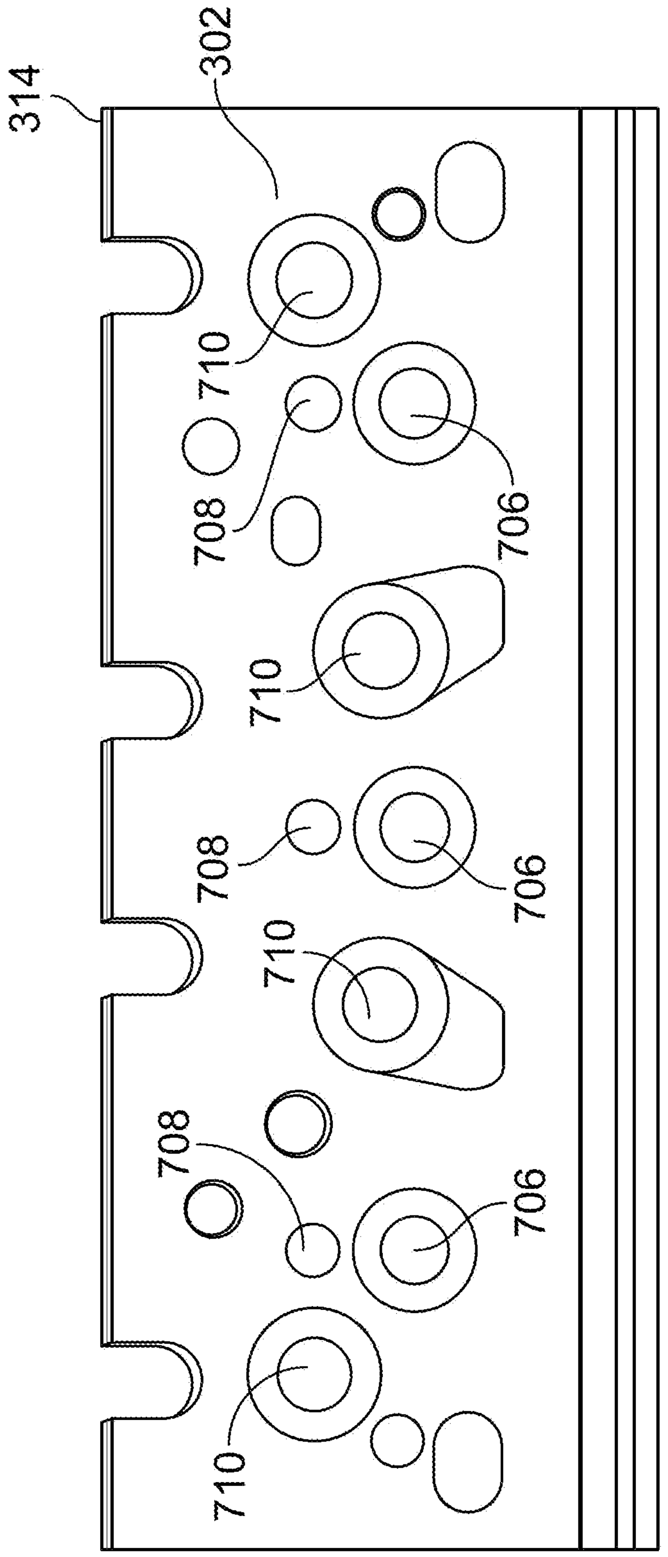
FIG. 11 illustrates an elevational view of an exit side of an exit die of the extruder assembly shown in FIG. 3.
Figure 12:
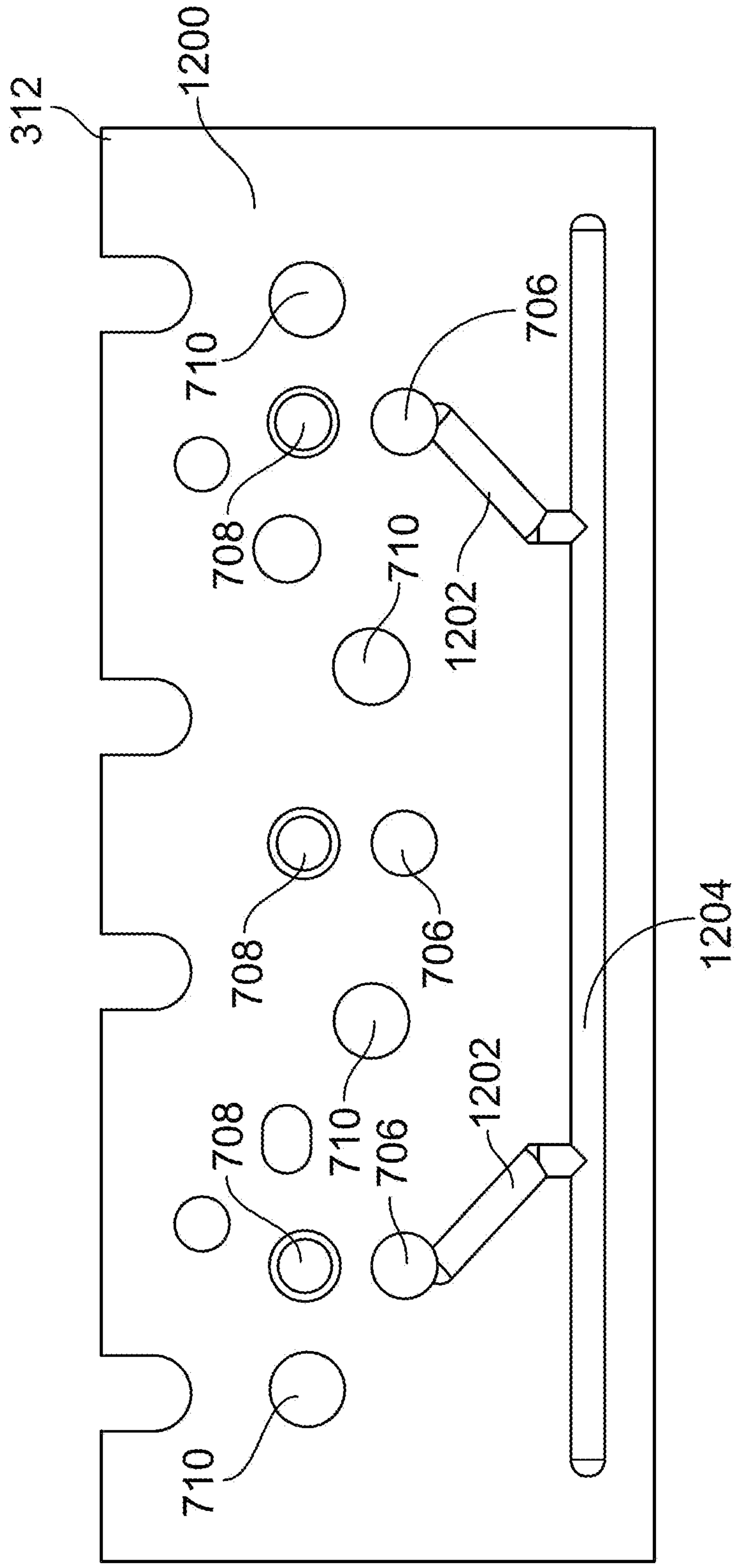
FIG. 12 illustrates an elevational view of an opposite interior side of the exit die shown in FIG. 11.

FIG. 9 illustrates an elevational view of the entry side of the entry die shown in FIG. 3. FIG. 10 illustrates an elevational view of an opposite interior side 1000 of the entry die shown in FIG. 3. FIG. 11 illustrates an elevational view of the exit side of the exit die shown in FIG. 3. FIG. 12 illustrates an elevational view of an opposite interior side 1200 of the exit die shown in FIG. 3. In one embodiment, the entry die and/or the exit die include several holes or openings through which plugs 322, fasteners 324, 326, and/or seals 328, 330 are inserted. The shim(s) include corresponding holes or openings through which the plugs, fasteners, and/or seals may be inserted. As described herein, the holes or openings through which an elongated component (e.g., a plug or fastener) is inserted may be coaxial with each other when the extruder assembly is assembled. The fasteners include plug fasteners 326 and shim fasteners 324. The seals include entry seals 328 (e.g., O-rings) and exit seals 330 (e.g., O-rings). The entry seals engage the entry side of the entry die and the exit seals engage the exit side of the exit die.

The holes or openings include plug openings 706 through which the plugs are inserted. The plug openings are present in both the exit and entry dies so that the plugs can be inserted into either the exit die or the entry die, as described herein. The holes or openings include plug fastener openings 708 through which the plug fasteners are inserted. The plug fastener openings are present in both the exit and entry dies so that the plug fasteners can be inserted into either the exit die or the entry die, as described herein. The holes or openings also include shim fastener openings 710 through which the shim fasteners are inserted. The plug fastener openings are present in both the exit and entry dies so that the plug fasteners can be inserted into either the exit die or the entry die, as described herein. These openings are labeled in the dies in FIG. 9 with the shim(s) including corresponding openings that are coaxial with the openings in the dies.

The plugs include plug heads 712 that engage the exterior of the exit die or the entry die, depending on the configuration of the extruder assembly. The plug heads include cutouts 714 shaped to receive the plug fasteners, as shown in FIGS. 3 and 4. These cutouts allow the plug fasteners to engage the plug heads and hold the plugs in place in the extruder assembly. The holes or openings in which the plug fasteners may be positioned relative to the holes or openings in which the plugs are inserted so that the internal conduits in the plugs are aligned with the conduits inside the exit die and/or entry die. This can ensure proper alignment between the conduits inside the dies and the plugs.

Alternatively, the extruder assembly may not include the plugs, or may include plugs that do not have the plug heads. As described below, the plugs may include internal conduits through which the adhesive flows through the extruder assembly. In an embodiment where the plugs are not included, the entry and/or exit dies may include the internal conduits of the plugs, with these conduits located in and extending through the entry die and/or exit die instead of the plugs.

To assemble the extruder assembly in the inbound direction configuration, the shim(s) are positioned between the entry die and exit die. The entry seals are inserted into the holes or openings 706 of the entry die and the exit seals are inserted into the holes or openings 706 of the exit die. Optionally, the plugs are inserted into the holes or openings 706 of the entry die with the entry seals disposed around the plugs. The plug fasteners may be inserted into the entry die via the holes or openings 708 through the entry side of the entry die. The plug fasteners can include external threads that engage corresponding internal threads in the entry die to compress and secure the plug heads against the extruder assembly. The die fasteners are inserted into the entry die via the holes or openings 710 through the entry side of the extruder assembly. The die fasteners can include external threads that engage corresponding internal threads in the exit die to compress and secure the entry die and the shims between the exit die and the entry die.

To change or assemble the extruder assembly in the outbound direction configuration, the plug fasteners, plugs, and seals are removed. The entry seals are inserted into the holes or openings 706 of the entry die and the exit seals are inserted into the holes or openings 706 of the exit die. The plugs are inserted into the holes or openings 706 of the exit die with the exit seals disposed around the plugs. The plug fasteners are inserted into the exit die via the holes or openings 708 through the exit side of the exit die. The plug fasteners can include external threads that engage corresponding internal threads in the exit die to compress and secure the plug heads against the extruder assembly. The extruder assembly can be converted from operating in the outbound direction to the inbound direction, or can be converted from operating in the inbound direction to the outbound direction.

Figure 13:
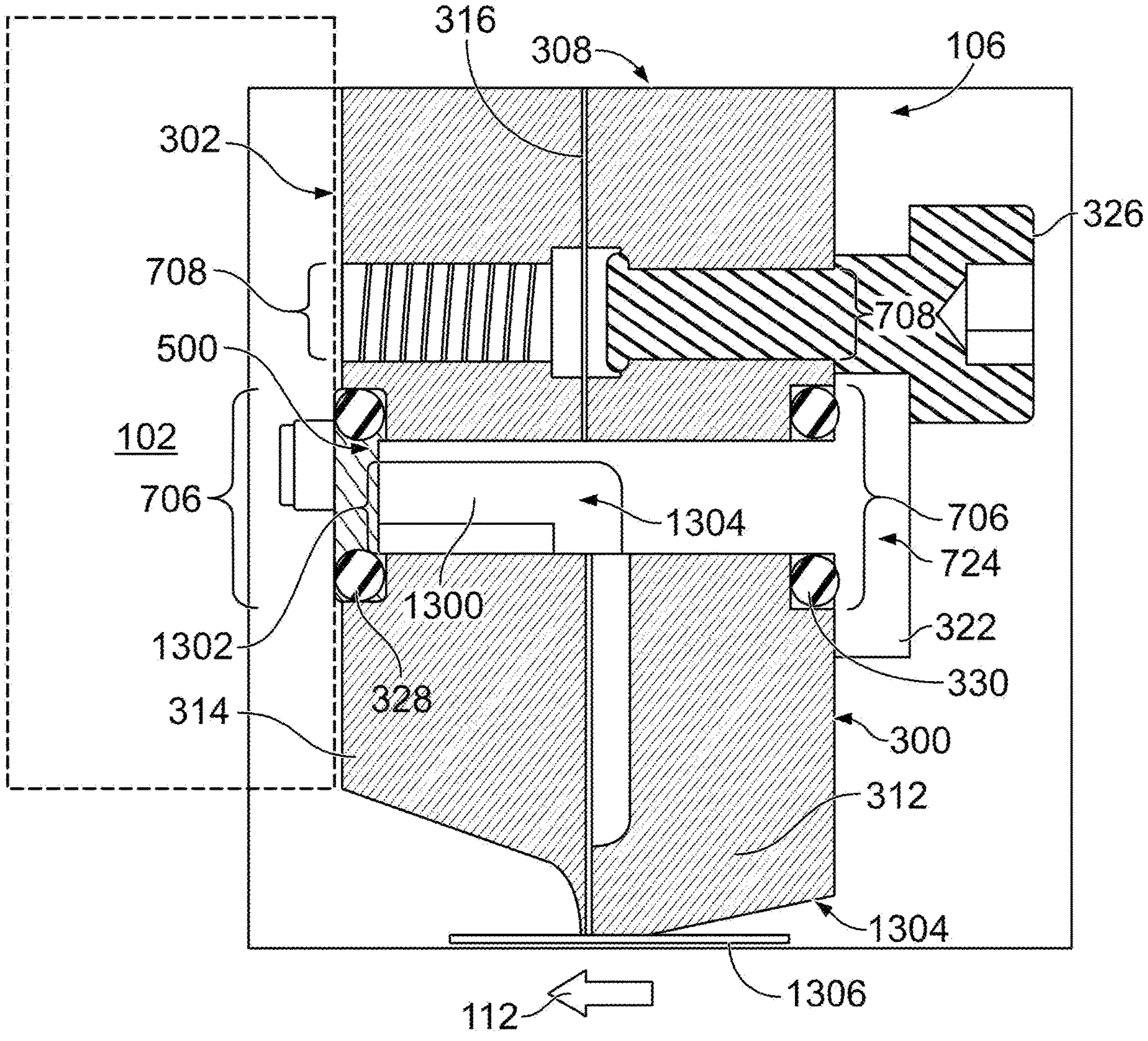
FIG. 13 illustrates a cross-sectional view of the extruder assembly in the inbound direction configuration.
Figure 14:
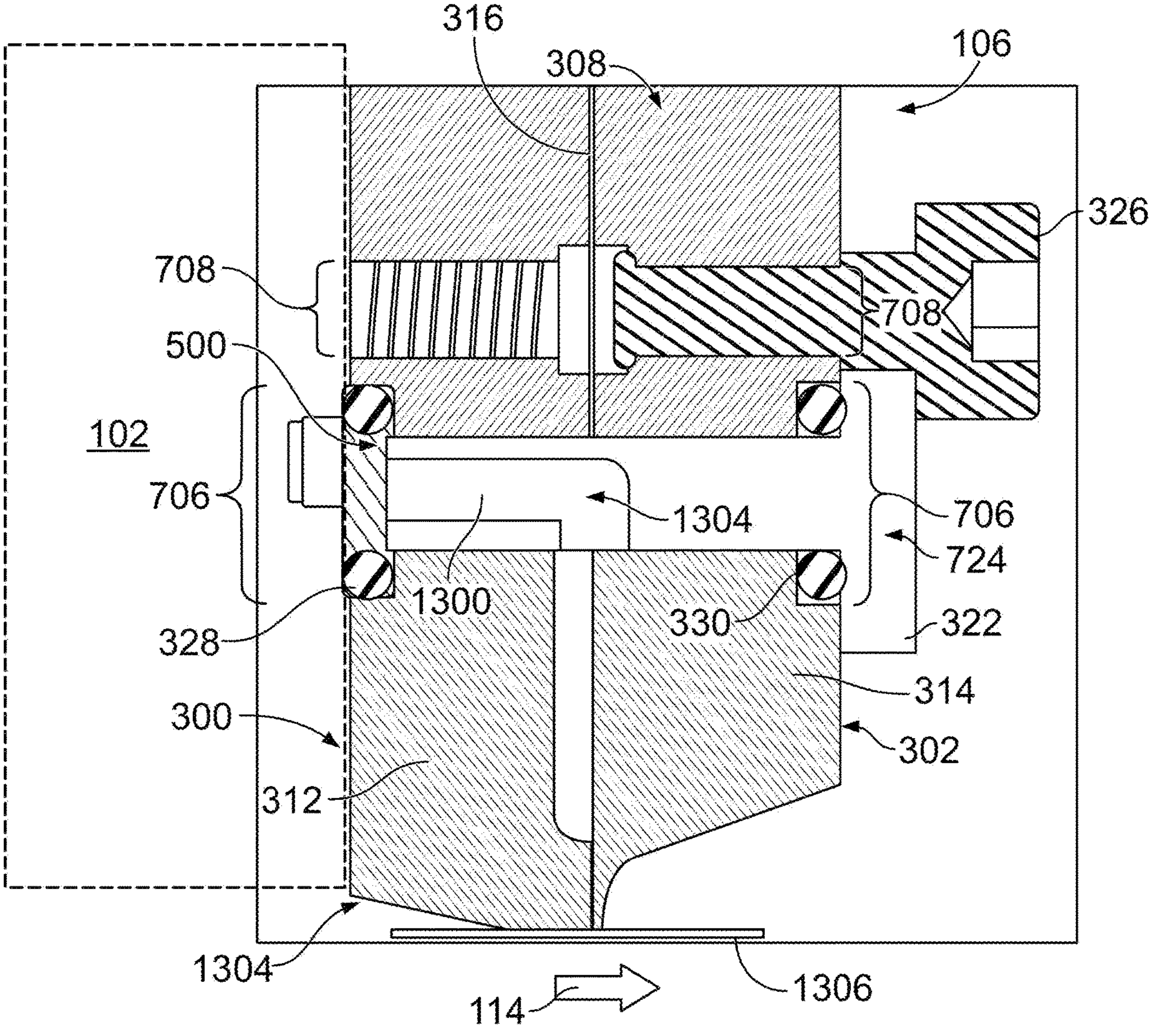
FIG. 14 illustrates a cross-sectional view of the extruder assembly in the outbound direction configuration.

FIG. 13 illustrates a cross-sectional view of the extruder assembly in the inbound direction configuration along line 13-13 in FIG. 4 and FIG. 14 illustrates a cross-sectional view of the extruder assembly in the outbound direction configuration along the same plane as the line indicated by line 13-13 in FIG. 4 (but in the outbound direction configuration). As shown in FIGS. 5, 13, and 14, the plugs are elongated and extend from the plug heads to entry ends 500. Each of the plugs can include an internal channel or conduit 1300 that extends from an entry hole or opening 1302 in the entry end toward, but not entirely to, the plug head. As shown in FIGS. 13 and 14, these internal channels or conduits in the plugs include a bend 1304 in a location that is midway or otherwise between the plug head and the entry end. Alternatively, the entry and/or exit dies can include the internal channels or conduits of the plugs, and the plugs may be omitted from the extruder assembly.

Figure 16:
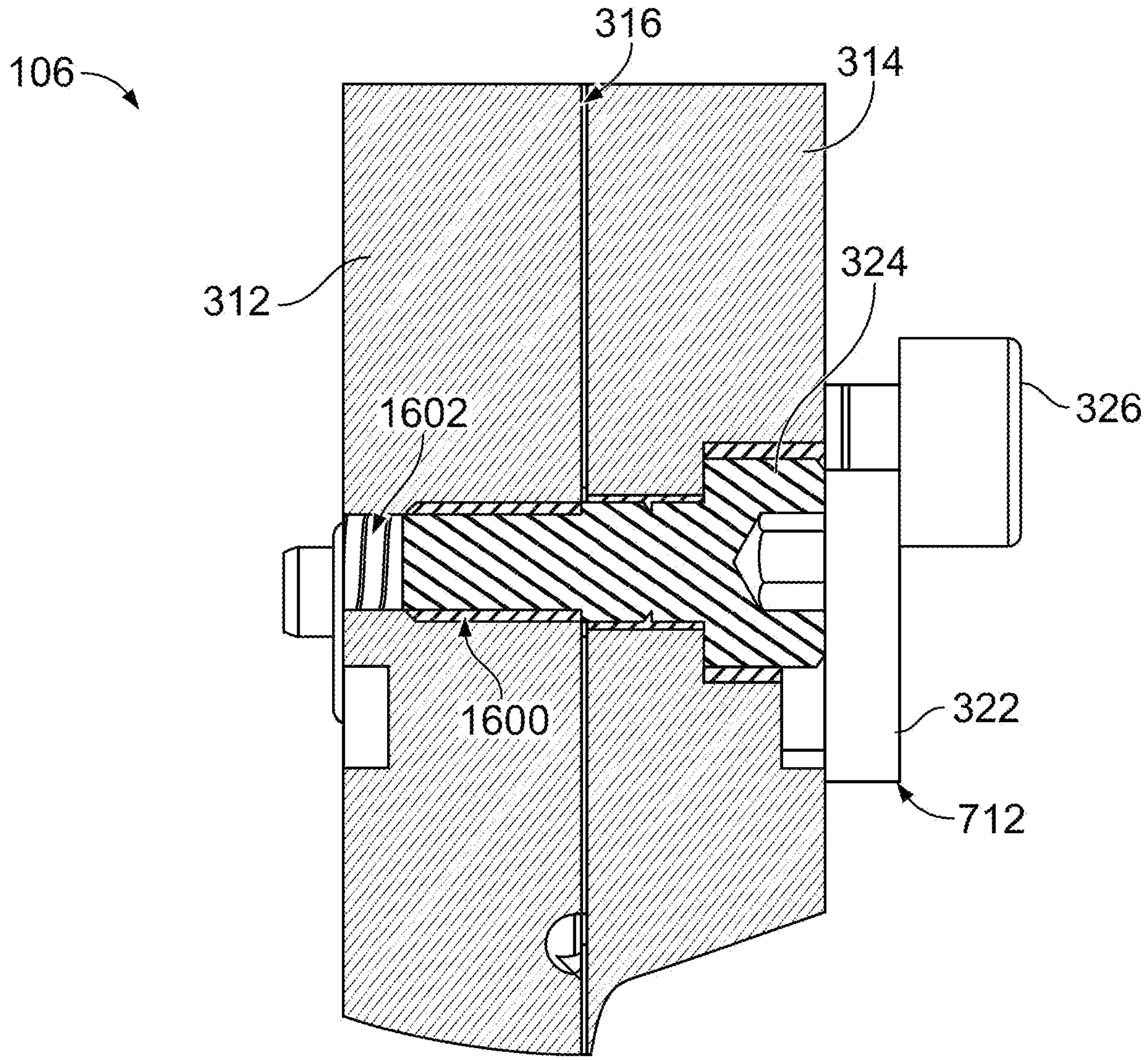
FIG. 16 illustrates another cross-sectional view of the extruder assembly in the outbound direction configuration along line 16-16 in FIG. 4.
Figure 17:
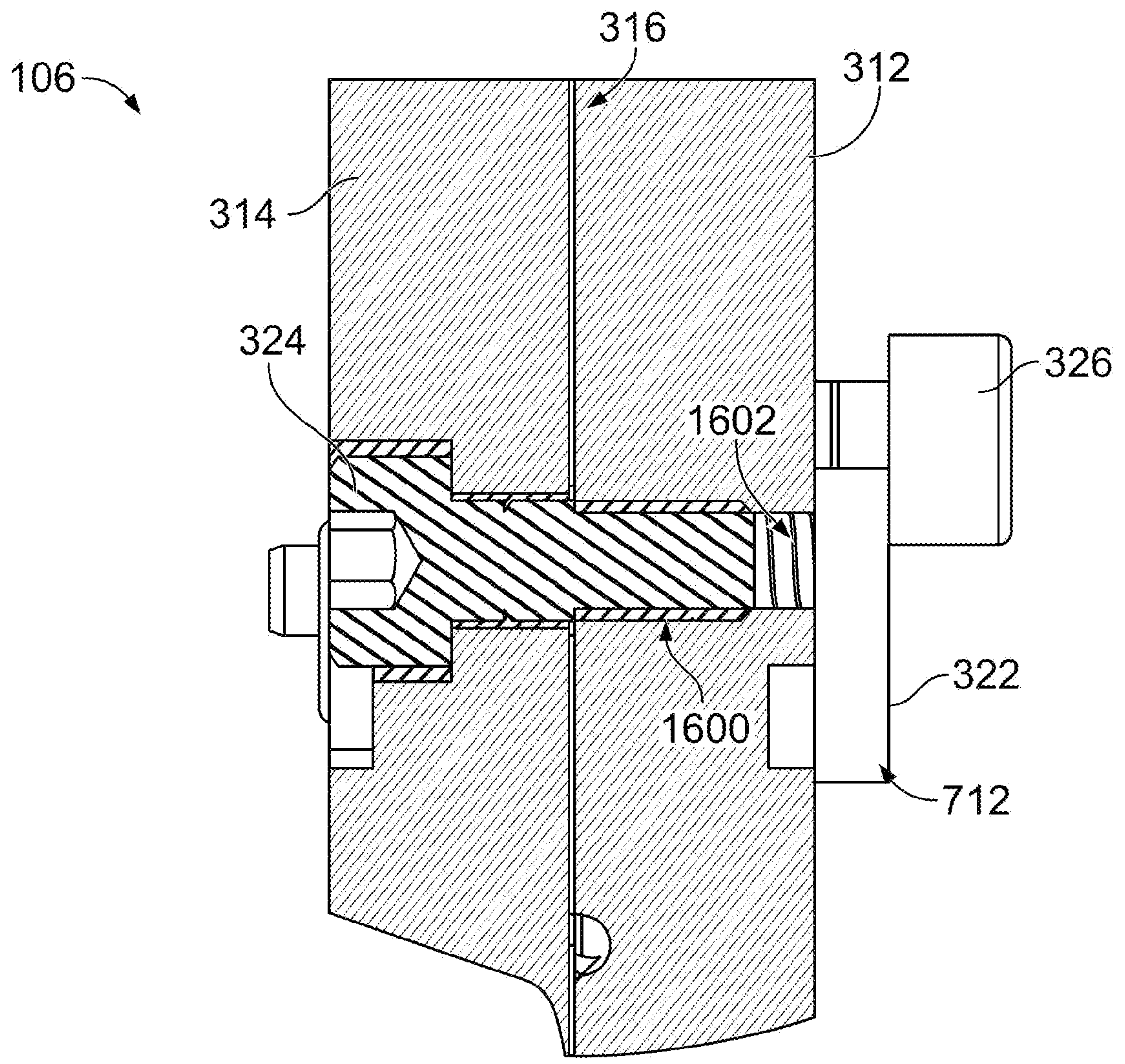
FIG. 17 illustrates another cross-sectional view of the extruder assembly in the inbound direction configuration along the same plane as the line indicated by line 16-16 in FIG. 4.

FIG. 16 illustrates another cross-sectional view of the extruder assembly in the outbound direction configuration along line 16-16 in FIG. 4 and FIG. 17 illustrates another cross-sectional view of the extruder assembly in the inbound direction configuration along the same plane as the line indicated by line 16-16 in FIG. 4 (but in the inbound direction configuration). As shown in FIGS. 16 and 17, the extruder assembly can be connected or fastened to the applicator body in an RCO arrangement. For example, the extruder assembly may be fastened to the applicator body by U-shaped slots 332 (shown in FIG. 3) at the top of the extruder assembly. The fasteners that hold the extruder assembly to the applicator body may only need to be loosened a couple of turns to remove the extruder assembly from the applicator body.

As shown in FIG. 10, the entry die includes channels or conduits 1002, 1004 that are fluidly coupled with each other. As shown in FIG. 12, the exit die may include channels or conduits 1202, 1204 that are fluidly coupled with each other. Alternatively, the exit die may not include the channels or conduits 1202, 1204 (e.g., where only a single shim is used). In the outbound or inbound direction configurations, the channels or conduits in the entry die may be fluidly coupled with the internal channel or conduit of the middle plug while the channels or conduits in the exit die may be fluidly coupled with the internal channel or conduit of the left and right plugs via the bends in the plugs. The conduits or channels 1004, 1204 are horizontally elongated or oriented and are fluidly coupled with vertical channels 713 in the shim 700 (shown in FIG. 7). In an example where multiple shims are provided, the additional shims (the shims that do not include the vertical channels) either include a cutout 714 (shown in FIG. 7) or are sufficiently sized (e.g., short) to allow adhesive to flow from the horizontal channel in the exit shim to the vertical channels without blocking the adhesive.

In operation and with respect to the inbound direction configuration of the extruder assembly shown in FIG. 13, the exit side of the extruder assembly faces the fluid applicator system. The adhesive flows out of the valve modules into the entry holes or openings of the plugs. The adhesive flows through the internal plug channels or conduits of the plugs to the bends inside the plugs. The adhesive then flows into the channels or conduits in the exit and entry dies. For example, the adhesive flowing out of the outer plugs (e.g., the left most and right most plugs in FIGS. 4 and 5) flows into the channels or conduits in the exit die while the adhesive flowing out of the middle plug flows into the channels or conduits in the entry die. The adhesive flows through the channels or conduits in the entry and exit dies to the vertical channels in the shims, where the adhesive is applied onto the strands or webs of material moving below the extruder assembly.

As shown in FIGS. 13 and 14, the applicator side of the entry die includes a curved surface 1304 that may engage or otherwise rub against strands or webs of material 1306 as the strands or webs move beneath the extruder assembly. The vertical channels in the shim direct the adhesive out of the extruder assembly and onto the strands or webs or material at the end of the lower surface of the entry shim. The lower surface of the entry shim is curved (e.g., has a constant radius or alternatively, may have several curves with different radii). This curved lower surface can assist with preventing the buildup of adhesive on the webs or strands of material as the webs or strands move beneath the extruder assembly.

The entry side of the extruder assembly faces away from the body of the fluid applicator system while the extruder assembly is in the inbound direction configuration (e.g., shown in FIG. 13). To re-configure the extruder assembly, the plug fasteners can be removed from the entry and exit dies by backing out the plug fasteners out of the exit side of the exit die. The plugs can then be removed out of the entry die by pulling the plugs out of the exit side of the entry die. The plugs may be inserted into the exit die through the exit side of the exit die, and the plug fasteners also are inserted into the exit die through the exit side of the exit die. The plug fasteners can be secured to internal threads of the exit die to hold the plugs in place. The extruder assembly is now in the outbound direction configuration with the entry die facing and abutting the fluid applicator system and the exit die facing away from the fluid applicator system. The webs or strands can then move in the outbound direction below the extruder assembly while the adhesive flows through and out of the extruder assembly onto the webs or strands. This allows for the extruder assembly to be quickly and easily converted between configurations to allow for the fluid applicator system to apply adhesive to the webs or strands in either the inbound or outbound direction.

Figure 15:
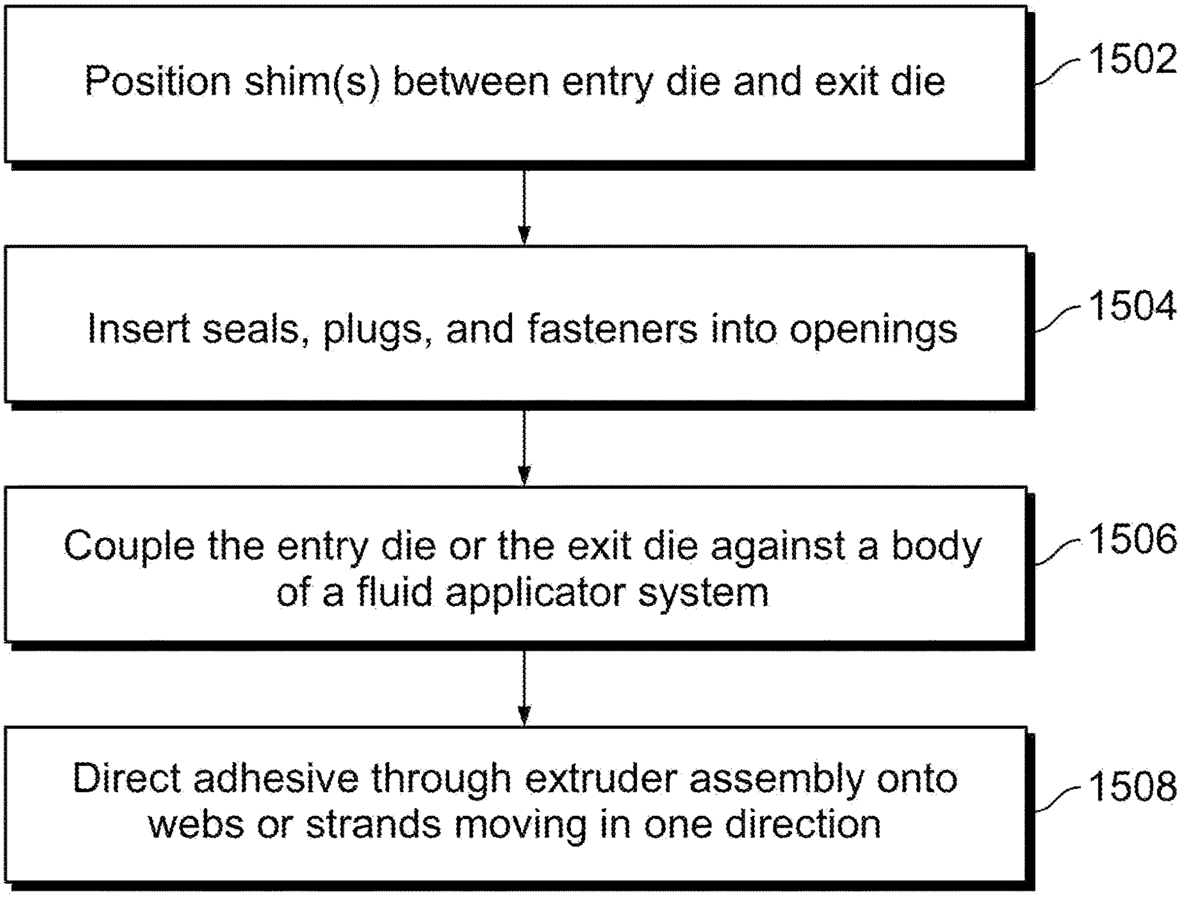
FIG. 15 illustrates a flowchart of one example of a method for dispensing adhesive from a fluid applicator system.

FIG. 15 illustrates a flowchart of one example of a method 1500 for dispensing adhesive from a fluid applicator system. The method can represent operations performed in assembling and coupling the extruder assembly to the fluid applicator system described herein. At 1502, the one or more shims are positioned between the entry die and the exit die. At 1504, the entry and exit seals, optional plugs, optional plug fasteners, and die fasteners are inserted into corresponding openings of the entry and exit dies, as described above. In another example, the plugs and plug fasteners may not be used or included in the extruder assembly. At 1506, depending on the directional configuration of the extruder assembly, either the entry die or the exit die is coupled against the fluid applicator system while the other of the entry die or the exit die faces outward and away from the fluid applicator system. At 1508, adhesive is directed through the conduits and channels of the dies and shim(s) of the extruder assembly and onto a web or strands of material moving beneath the extruder assembly. If the exit shim is positioned against the body of the fluid applicator system, then the adhesive can be applied through the extruder assembly while the web or strands move in the inbound direction 112. If the entry shim is positioned against the body of the fluid applicator system, then the adhesive can be applied through the extruder assembly while the web or strands move in the outbound direction 114. If the direction in which the web or strands move beneath the extruder assembly is to change, then the extruder assembly may be disassembled and re-assembled with the other of the entry or exit die positioned against the body of the fluid applicator system, as described above.

In one example, an extruder assembly is provided and includes an entry die including one or more first openings, an exit die including one or more second openings, and one or more shims disposed between the entry die and the exit die. The one or more shims may include one or more channels and the exit die may be coupled with a body of a fluid applicator system with the entry die facing away from the body of the fluid applicator system to direct a fluid adhesive flowing into the exit die, through the one or more channels in the one or more shims, and out of the exit die, the entry die, and the one or more shims onto a first web or strand of material moving in a first direction relative to the entry die and the exit die. The entry die may be coupled with the body of the fluid applicator system with the exit die facing away from the body of the fluid applicator system to direct the fluid adhesive flowing into the entry die, through the one or more channels in the one or more shims, and out of the entry die, the exit die, and the one or more shims onto a second web or strand of material moving in a second direction relative to the entry die and the exit die.

Optionally, the entry die may include one or more channels that are fluidly coupled with the one or more channels of the one or more shims and through which the fluid adhesive flows. The exit die may include one or more channels that are fluidly coupled with the one or more channels of the one or more shims and through which the fluid adhesive flows. The entry die and the exit die may be coupled with each other such that the one or more first openings in the entry die are coaxial with the one or more second openings in the exit die. Each of the entry die and the exit die may include one or more fastener openings have internal threads. The assembly also may include one or more threaded fasteners configured to be inserted into the one or more fastener openings of one of the entry die or the exit die. The one or more threaded fasteners may extend through the one of the entry die or the exit die into which the one or more threaded fasteners are inserted and to engage the internal threads of the one or more fastener openings of another of the entry die or the exit die to clamp the entry die, the one or more shims, and the exit die together in a rapid change-out configuration.

The assembly of also may include one or more plugs that may be placed into at least one of the one or more first openings or at least one of the one or more second openings. The one or more plugs may include an internal conduit through which the fluid adhesive flows from the entry die or the exit die, through the one or more plugs, and into the one or more channels of the one or more shims. Each of the one or more plugs may be elongated from a plug head to an entry end. The plug head may engage an exterior surface of the entry die or the exit die. The entry end may receive the fluid adhesive from the fluid applicator. The assembly also may include one or more plug fasteners configured to couple with the entry die or the exit die and to secure the one or more plugs to the entry die or the exit die.

A method is provided that may include attaching an extruder assembly with an applicator head of an adhesive applicator system. The extruder assembly may have one or more shims with one or more channels between an entry die having one or more first openings and an exit die having one or more second openings. The one or more shims may be positioned between the entry die and the exit die with the one or more channels of the one or more shims fluidly coupled with the one or more first openings of the entry die or the one or more second openings of the exit die. The one or more shims may be oriented to direct a fluid adhesive from the applicator head via the one or more first openings in the entry die or the one or more second openings in the exit die onto a first web or strand of material moving in a first direction beneath the entry die and the exit die. The method also may include removing the one or more shims from between the entry die and the exit die, and switching positions of the entry die and the exit die relative to the applicator head. The method can include coupling the entry die, the one or more shims, and the exit die with the applicator head after switching positions of the entry die and the exit die. The entry die, the one or more shims, and the exit die may be coupled with the applicator head to direct the fluid adhesive onto a second web or strand of material moving in a second direction beneath the entry die and the exit die.

The method also may include inserting one or more plug fasteners into one or more third openings in the entry die. The one or more plug fasteners may be inserted into the one or more third openings in the entry die to secure one or more internal plugs against the exit die. The method also can include removing the one or more plug fasteners from the one or more third openings in the entry die, and inserting the one or more plug fasteners into one or more fourth openings in the exit die. The one or more plug fasteners may be inserted into the one or more fourth openings in the exit die to secure the one or more internal plugs against the entry die.

Inserting the one or more plug fasteners into the one or more third openings in the entry die may align internal channels of the one or more internal channel plugs with one or more internal conduits of the entry die. Inserting the one or more plug fasteners into the one or more fourth openings in the entry die may align internal channels of the one or more internal channel plugs with one or more internal conduits of the exit die.

The method also may include inserting one or more die fasteners into one or more third openings in the entry die. The one or more die fasteners may be inserted into the one or more third openings in the entry die to secure the entry die with the exit die. The method may include removing the one or more die fasteners from the one or more third openings in the entry die, and inserting the one or more die fasteners into one or more fourth openings in the exit die. The one or more die fasteners may be inserted into the one or more fourth openings in the exit die to secure the exit die with the entry die.

A reversible extruder assembly for a hot melt adhesive fluid applicator system also is provided. The extruder assembly may include an entry die including one or more first openings and one or more first internal channels, an exit die including one or more second openings and one or more second internal channels, and one or more shims having one or more third internal channels. The one or more shims may be positioned between the entry die and the exit die with the one or more third internal channels of the one or more shims fluidly coupled with the one or more first internal channels of the entry die and the one or more second internal channels of the exit die.

The entry die, the exit die, and the one or more shims may be coupled together in a first configuration to dispense a hot melt adhesive onto a first web or strand of material moving in a first direction beneath the entry die and the exit die. The entry die, the exit die, and the one or more shims may be coupled together in a second configuration to dispense the hot melt adhesive onto a second web or strand of material moving in a second direction beneath the entry die and the exit die. The entry die and the exit die may be coupled with each other such that the one or more first openings in the entry die are coaxial with the one or more second openings in the exit die.

The extruder assembly also may include one or more plug fasteners that may be inserted into one or more third openings in the entry die to secure the one or more plugs to the entry die. The one or more plug fasteners may be inserted into one or more fourth openings in the exit die to secure the one or more plugs to the exit die. Each of the one or more plugs may be elongated from plug head to an open-ended plug end. The open-ended plug end may be inserted into the one or more first openings in the entry die and positioned to receive a hot melt adhesive into the one or more third internal channels of the one or more plugs via the open-ended plug end. The one or more third internal channels of the one or more plugs may include a bend that aligns the one or more third internal channels of the one or more plugs with the one or more first internal channels of the entry die or the one or more second internal channels of the exit die.

The singular forms “a”, “an”, and “the” include plural references unless the context clearly dictates otherwise. “Optional” or “optionally” means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as “about,” “substantially,” and “approximately,” may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. An extruder assembly comprising:

an entry die including one or more first openings;

an exit die including one or more second openings;

one or more shims disposed between the entry die and the exit die, the one or more shims including one or more channels; and wherein the exit die is configured to be coupled with a body of a fluid applicator system with the entry die facing away from the body of the fluid applicator system to direct a fluid flowing into the exit die, through the one or more channels in the one or more shims, and out of the exit die, the entry die, and the one or more shims onto a first web or strand of material moving in a first direction relative to the entry die and the exit die, wherein the entry die also is configured to be coupled with the body of the fluid applicator system with the exit die facing away from the body of the fluid applicator system to direct the fluid flowing into the entry die, through the one or more channels in the one or more shims, and out of the entry die, the exit die, and the one or more shims onto a second web or strand of material moving in a second direction relative to the entry die and the exit die;

wherein the entry die and the exit die are configured to switch positions relative to an applicator head of the fluid applicator system to couple the entry die, the one or more shims, and the exit die with the applicator head after switching positions of the entry die and the exit die.

2. The extruder assembly of claim 1, wherein the entry die includes one or more channels that are fluidly coupled with the one or more channels of the one or more shims and through which the fluid flows.

3. The extruder assembly of claim 1, wherein the exit die includes one or more channels that are fluidly coupled with the one or more channels of the one or more shims and through which the fluid flows.

4. The extruder assembly of claim 1, wherein the entry die and the exit die are coupled with each other such that the one or more first openings in the entry die are coaxial with the one or more second openings in the exit die.

5. The extruder assembly of claim 1, wherein each of the entry die and the exit die includes one or more fastener openings have internal threads, and further comprising:

one or more threaded fasteners configured to be inserted into the one or more fastener openings of one of the entry die or the exit die, the one or more threaded fasteners configured to extend through the one of the entry die or the exit die into which the one or more threaded fasteners are inserted and to engage the internal threads of the one or more fastener openings of another of the entry die or the exit die to clamp the entry die, the one or more shims, and the exit die together in a rapid change-out configuration.

6. The extruder assembly of claim 1, further comprising:

one or more plugs configured to be placed into at least one of the one or more first openings or at least one of the one or more second openings, the one or more plugs including an internal conduit through which the fluid flows from the entry die or the exit die, through the one or more plugs, and into the one or more channels of the one or more shims.

7. The extruder assembly of claim 6, wherein each of the one or more plugs is elongated from a plug head to an entry end, the plug head configured to engage an exterior surface of the entry die or the exit die, the entry end configured to receive the fluid from the fluid applicator system.

8. The extruder assembly of claim 6, further comprising:

one or more plug fasteners configured to couple with the entry die or the exit die and to secure the one or more plugs to the entry die or the exit die.

9. A method comprising:

attaching an extruder assembly with an applicator head of an adhesive applicator system, the extruder assembly having one or more shims with one or more channels between an entry die having one or more first openings and an exit die having one or more second openings, the one or more shims positioned between the entry die and the exit die with the one or more channels of the one or more shims fluidly coupled with the one or more first openings of the entry die or the one or more second openings of the exit die, the one or more shims oriented to direct a fluid from the applicator head via the one or more first openings in the entry die or the one or more second openings in the exit die onto a first web or strand of material moving in a first direction beneath the entry die and the exit die;

removing the one or more shims from between the entry die and the exit die; and switching positions of the entry die and the exit die relative to the applicator head;

coupling the entry die, the one or more shims, and the exit die with the applicator head after switching positions of the entry die and the exit die, the entry die, the one or more shims, and the exit die coupled with the applicator head to direct the fluid onto a second web or strand of material moving in a second direction beneath the entry die and the exit die.

10. The method of claim 9, further comprising:

inserting one or more plug fasteners into one or more third openings in the entry die, the one or more plug fasteners inserted into the one or more third openings in the entry die to secure one or more internal plugs against the exit die;

removing the one or more plug fasteners from the one or more third openings in the entry die; and inserting the one or more plug fasteners into one or more fourth openings in the exit die, the one or more plug fasteners inserted into the one or more fourth openings in the exit die to secure the one or more internal plugs against the entry die.

11. The method of claim 10, wherein inserting the one or more plug fasteners into the one or more third openings in the entry die aligns internal channels of the one or more internal channel plugs with one or more internal conduits of the entry die.

12. The method of claim 10, wherein inserting the one or more plug fasteners into the one or more fourth openings in the exit die aligns internal channels of the one or more internal channel plugs with one or more internal conduits of the exit die.

13. The method of claim 9, further comprising:

inserting one or more die fasteners into one or more third openings in the entry die, the one or more die fasteners inserted into the one or more third openings in the entry die to secure the entry die with the exit die;

removing the one or more die fasteners from the one or more third openings in the entry die; and inserting the one or more die fasteners into one or more fourth openings in the exit die, the one or more die fasteners inserted into the one or more fourth openings in the exit die to secure the exit die with the entry die.

14. A reversible extruder assembly for a fluid applicator system, the reversible extruder assembly comprising:

an entry die including one or more first openings and one or more first internal channels;

an exit die including one or more second openings and one or more second internal channels; and one or more shims having one or more third internal channels, the one or more shims configured to be positioned between the entry die and the exit die with the one or more third internal channels of the one or more shims fluidly coupled with the one or more first internal channels of the entry die and the one or more second internal channels of the exit die;

wherein the entry die and the exit die are configured to switch positions relative to an applicator head of the fluid applicator system to couple the entry die, the one or more shims, and the exit die with the applicator head after switching positions of the entry die and the exit die.

15. The reversible extruder assembly of claim 14, wherein the entry die, the exit die, and the one or more shims are configured to be coupled together in a first configuration to dispense a fluid onto a first web or strand of material moving in a first direction beneath the entry die and the exit die.

16. The reversible extruder assembly of claim 15, wherein the entry die, the exit die, and the one or more shims are configured to be coupled together in a second configuration to dispense the fluid onto a second web or strand of material moving in a second direction beneath the entry die and the exit die.

17. The reversible extruder assembly of claim 14, wherein the entry die and the exit die are coupled with each other such that the one or more first openings in the entry die are coaxial with the one or more second openings in the exit die.

18. The reversible extruder assembly of claim 14, further comprising:

one or more plug fasteners configured to be inserted into one or more third openings in the entry die to secure one or more plugs to the entry die, the one or more plug fasteners also configured to be inserted into one or more fourth openings in the exit die to secure the one or more plugs to the exit die.

19. The reversible extruder assembly of claim 18, wherein each of the one or more plugs is elongated from plug head to an open-ended plug end, the open-ended plug end configured to be inserted into the one or more first openings in the entry die and positioned to receive a fluid into the one or more third internal channels of the one or more plugs via the open-ended plug end.

20. The reversible extruder assembly of claim 18, wherein the one or more third internal channels of the one or more plugs include a bend that aligns the one or more third internal channels of the one or more plugs with the one or more first internal channels of the entry die or the one or more second internal channels of the exit die.

* * * * *